J. NORTHROP.

MISTHREADING DEVICE.

APPLICATION FILED FEB. 2, 1917.

Reissued Feb. 27, 1917.

14,265.

2 SHEETS—SHEET 1.

Inventor:
Jonas Northrop
by Robt. P. Haine
Atty.

J. NORTHROP.

MISTHREADING DEVICE.

APPLICATION FILED FEB. 2, 1917.

Reissued Feb. 27, 1917.

14,265.

2 SHEETS—SHEET 2.

Inventor:
Jonas Northrop.
by Robt. P. Haines
Atty.

UNITED STATES PATENT OFFICE.

JONAS NORTHROP, OF HOPEDALE, MASSACHUSETTS, ASSIGNOR, BY MESNE ASSIGNMENTS, TO DRAPER COMPANY, A CORPORATION OF MAINE.

MISTHREADING DEVICE.

14,265. Specification of Reissued Letters Patent. Reissued Feb. 27, 1917.

Original No. 987,817, dated March 28, 1911, Serial No. 571,590, filed July 12, 1910. Application for reissue filed February 2, 1917. Serial No. 146,081.

*To all whom it may concern:*

Be it known that I, JONAS NORTHROP, a citizen of the United States, residing at Hopedale, in the county of Worcester and State of Massachusetts, have invented an Improvement in Misthreading Devices, of which the following description, in connection with the accompanying drawings, is a specification, like letters on the drawings representing like parts.

The invention to be hereinafter described relates to looms, and more particularly to looms of the filling replenishing type wherein at desired times a fresh supply of filling is automatically furnished.

In looms of the above general type filling carriers are transferred from an appropriate supply into the shuttle when the latter is to be replenished and is in proper position for such operation. It happens at times, following the action of replenishment, that the filling becomes broken at the moment of transfer or prior to the arrival of the shuttle in the box on the side of the loom remote from the replenishing mechanism; or that a like condition arises on the return of the shuttle to the replenishing side, especially where the shuttle fails to be properly threaded following replenishment. Where the filling breaks under the first of the above conditions, which is technically known in the art as a "hopper misthread", and which for conciseness of description will hereinafter be thus designated, a new supply of filling has heretofore been furnished the shuttle on its return to the replenishing side. Obviously should a number of hopper misthreads occur in succession, the transfer of filling carriers to the shuttle might continue until finally the supplying means would become exhausted. Where the filling breaks under the second of the above conditions, that is where the shuttle fails to be properly threaded, the breakage occurs on the return of the shuttle to the replenishing side, because the filling leads from the carrier in the shuttle directly backward to the cloth selvage as the shuttle travels through the shed, so that the filling cannot unwind from the carrier and breakage necessarily occurs. This is technically known in the art as a "real misthread", and for brevity such conditions will hereinafter be designated by such term.

To prevent exhaustion of the filling carrier supplying means on the occurrence of a succession of "hopper misthreads" attempts have heretofore been made to stop the loom on the occurence of two of such faults in succession, but in all of such cases should intact filling be laid once, on a detecting pick following a misthread the parts were returned to initial position, so that to effect stoppage of the loom thereafter two successive absences of filling were required, with the result that stoppage for a "real misthread" was precluded, and the loom would continue to operate until the hopper became exhausted and a length of cloth had been woven with thin places therein.

With these facts in mind, the present invention aims, among other things, to provide means whereby if filling is absent on two alternate detecting beats, the loom will stop regardless of whether filling is present or not on the intermediate beat. These, and other objects of the invention which will be more fully developed herein, will best be understood from the following description and accompanying drawings of one form of means for carrying the invention into practical effect.

In the drawings:—

Figure 1:
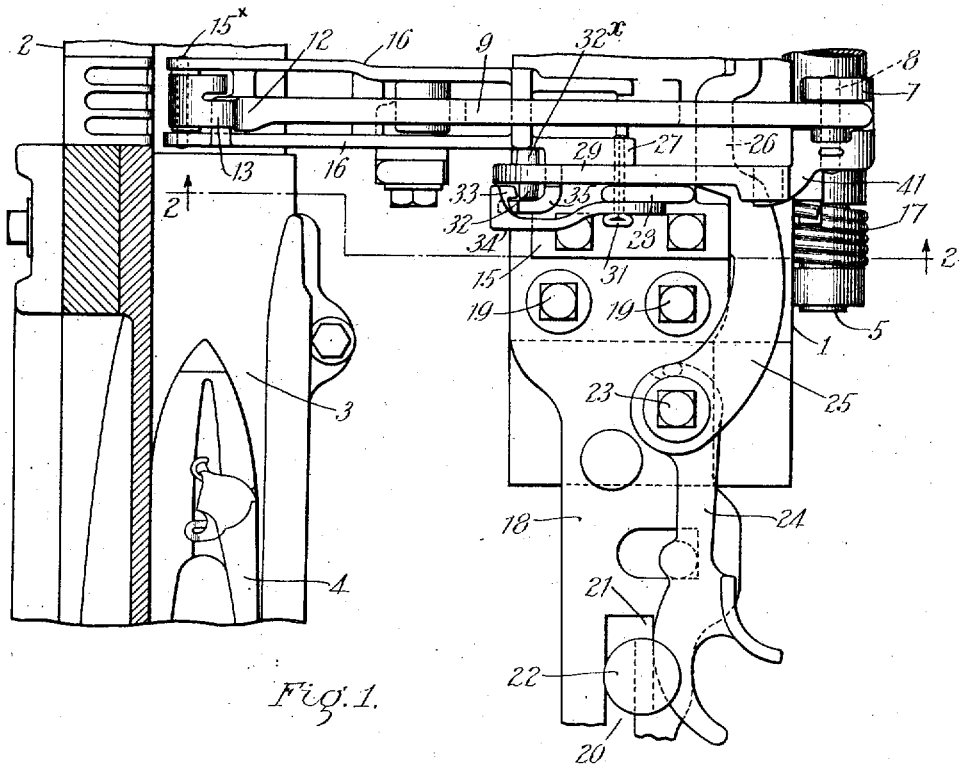
Figure 1 is a plan view of so much of one side of a loom embodying the present invention as is desirable to show the relation of the invention to its coacting parts.

The loom frame including the breast beam 1, lay 2, shuttle box 3, the shuttle 4, the transverse shaft 5, and its supporting brackets 6 which afford bearing therefor may all be of any usual or well known character and construction. The filling replenishing mechanism, which is controlled as to its replenishing action from the transverse shaft 5, is not herein shown, as its various appropriate forms and its location at that side of the loom remote from the detecting mechanism or weft fork device, to be hereinafter described, are well understood by those skilled in the art. Said replenishing mechanism may be of any desired form and construction now well known, whereby upon turning movement of the transverse shaft 5, devices are put in position to cause said mechanism to replenish the filling in the shuttle when the latter returns to the replenishing side following detection of filling fault. One appropriate form of such mechanism is shown and described in my application, Serial No. 516,240, filed September 4, 1909 (Patent No. 973,127, Oct. 18, 1910), but is is understood that I do not restrict my invention to such form of replenishing means, as it may be employed with any desired character of devices which upon indication for replenishment will effect the necessary transfer.

Figure 2:
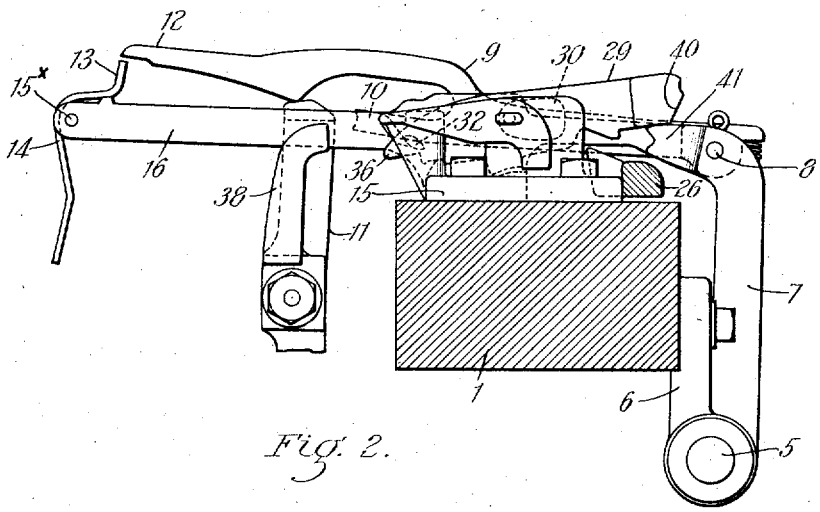
Fig. 2 is a section on the line 2—2, Fig. 1.

Mounted on the transverse shaft 5 is an arm 7 jointed at 8 to an actuator 9 having a part 10 adapted to be engaged by the weft hammer 11, which is itself moved in usual manner, well understood by those skilled in the art, to cause the actuator 9 to travel to the right, Figs. 1 and 2, or toward the front of the loom, when said actuator, during the detecting beat-up of the lay, has its end 12 sustained by the arm 13 of the weft fork 14, which fails to be tilted upon an absence of filling. Secured to the breast beam 1 is a bracket 15 having the fixed supporting arms 16 projecting rearwardly which support the pivot 15× of the weft fork 14. A spring 17 having one end connected to the transverse shaft 5 and the other end fixed to the loom frame, normally acts to hold the said shaft with the parts in position as indicated by Figs. 1 and 2, but, upon movement of the actuator 9 to the right, Figs. 1 and 2, or toward the front of the loom, by the weft hammer, permits said shaft to turn under the action of the arm 7.

The parts thus far described with respect to the detecting mechanism may be substantially as in my prior application, Serial No. 516,849, filed September 9, 1909, the construction being such that should filling not be laid by the shuttle as it passes to that side of the loom remote from the replenishing mechanism, the following beat up movement of the lay, which for identification may be herein known as the detecting beat, will fail to tilt the filling fork, so that the actuator 9 will be sustained by the said fork and, as the weft hammer moves to the front or to the right, Figs. 1 and 2, it will engage and move the actuator, with the result that the transverse shaft 5 will be partially turned to position the parts for filling replenishment on the next beat up movement of the lay when the shuttle is on the filling replenishing side of the loom, all as will be readily understood by those familiar with this class of machines.

Projecting from the end of the breast beam 1 is a bracket 18 appropriately secured to the breast by means, such as the bolts 19, said bracket being provided with the usual slot 20 and holding notch 21 for a shipper 22. Pivoted to the bracket 18, at 23, is a knock-off lever 24 adapted to disengage the shipper from its holding notch 21 and stop the loom. Extending from the pivotal mounting 23 of the lever 24 is a stop arm 25, which, upon movement clockwise, viewing Fig. 1, is adapted to actuate the knock-off lever 24 and cause loom stoppage. The end portion 26 of the stop arm 25 projects into a position to be engaged by a part and moved thereby, as will presently appear.

The fixed bracket 15 has a side portion provided with upwardly projecting ears or lugs 27, 28, between which is loosely mounted the rider 29, which, if desired, may have an enlarged opening 30 to permit the passage of a retaining pin 31, said pin acting to prevent accidental dislodgment of the rider while permitting free longitudinal and tilting action thereof.

The rider has a side cam 32 which on longitudinal movement of the rider to the left or rearwardly is adapted to engage a complemental portion 33 on a lifter 34, Fig. 1, a lug 35 serving to support the rider lifter in proper coacting relation with the rider. From the construction thus far described it will be apparent that should the rider 29 be moved to the left, Fig. 1, or rearwardly, the side cam 32 will travel up the portion 33 of the lifter 34 until such cam passes over the portion 33, see Figs. 3 and 4. The details in these respects may be variously modified within the true scope of the invention, as will be obvious. The rider may be provided with an additional projection 32× on the side opposite the cam 32, which, in connection with the bracket, may act to guide the end of the rider as it is moved longitudinally, but this is not essential.

Referring more particularly to the detail views of the rider in Figs. 3 to 9, inclusive, it will be noted that said rider has a nose 36 and a shoulder 37 to be engaged under certain conditions hereinafter described by a part 38 secured to the weft hammer, and which for identification herein may be termed the rider hammer. At its opposite end portion the rider 29, see Figs. 3 to 9, inclusive, is provided with an under sustaining shoulder or rest 39 and an inclined portion 40 which, under conditions to be presently described, coact with a part 41 connected to the transverse shaft 5 and herein conveniently formed as a finger projecting from the arm 7, see Figs. 1 and 2, although, as is evident, it may be variously contrived, the essential being that it partake of the transverse shaft movement. The under portion of the rider has a portion 42, which at times may rest upon a lip 43 formed on the bracket 15 and at other times may rest in the recess 44 of said bracket, as will later be described. The rider has a stop shoulder 45 on its under portion adapted to engage the toe 46 extending from the end portion 26 of the lever 25, which on movement of the rider to the right or toward the front of the loom causes loom stoppage, a recess 47 being provided to, at times, engage the toe 46. The end of the rider at the right and the end of the finger 41 may be provided with complemental engaging portions 48 and 49 respectively, in order that said parts may properly coact to secure movement of the rider by the finger under conditions to be further explained, it being understood that these various details of rider construction may be modified in many ways within the present invention which is defined in its true scope by the claims.

Figure 7:
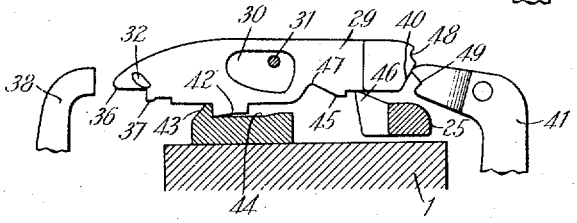
Figure 8:
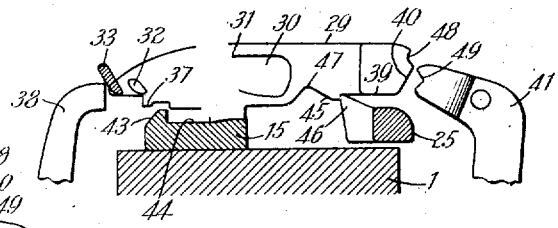
Figure 9:
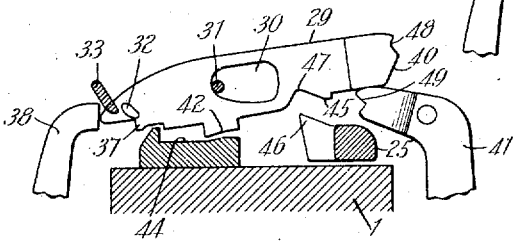

During normal working condition of the loom the parts are disposed relatively, as indicated in Figs. 2 and 9, with one end portion of the rider resting on the top of the finger 41 and the nose 36 of the rider in the path of movement of the rider hammer 38. Bearing in mind that the weft hammer and perforce the rider hammer move forward once for every two beats of the lay and that such forward movements follow the detecting pick of the shuttle, should the filling be absent on a detecting beat or forward movement of the hammers, the actuator 9 will be moved to the front, turn the transverse shaft 5 and move the finger 41 from under the front end of the rider from the position Fig. 2 to that of Fig. 3 and cause filling replenishment on the beat-up following the arrival of the shuttle to the replenishing side of the loom. On the next movement of the weft hammer and rider hammer, which is the non-detecting or rearward movement, the finger 41 will engage the end of the rider which is now in position, Fig. 3, and move the rider to the left, the cam 32 on the rider moving over the part 33 of the rider lifter and the parts assuming the position represented by Fig. 4. On the next forward movement of the hammers, which is their detecting movement and follows the detecting pick of the shuttle, should no filling have been laid in front of the weft fork, the rider hammer 38 will engage the shoulder 37 of the rider and move the rider from the position, Fig. 4, to that of Fig. 5, the finger 41 being simultaneously moved to the front and the filling replenishing mechanism being positioned for the transfer of a carrier to the shuttle as the lay beats up following the arrival of the shuttle at the filling replenishing side of the loom. However, should the shuttle lay filling in front of the filling fork on this pick, the rider hammer will engage the shoulder 37 as before and move the rider to the front or to the right, but since the filling fork was tilted as the lay beat up following this pick of the shuttle from the replenishing side of the loom, the finger 41 will not be moved but will remain as in Fig. 6, consequently the inclined portion 40 of the rider will rise over the end of the finger and the parts assume position as in Fig. 6. On the next or rearward movement of the hammers, which is a non-detecting movement, the parts will be moved from positions of either Figs. 5 or 6 to that of Fig. 7, because if filling is not laid, as would be the case in a "hopper misthread" when the parts move from position indicated by Fig. 4 to that of Fig. 5, the backward movement of the finger 41 will cause it to contact with the rider at 48 and move the rider to the position of Fig. 7; and in case there is no "hopper misthread" on this detecting movement, then the finger 41 will not be moved to the front and as the rider hammer moves back, the incline 40 of the rider will cause it to pass from position of Fig. 6 to that of Fig. 7. In the position of parts thus reached after a first absence of filling and consequent replenishment of the shuttle, whether filling be present or not on the detecting movement of parts following such replenishment, the stop shoulder 45 of the rider will take position back of the toe 46 of the lever end 26 and be related thereto to cause either loom stoppage on a second hopper misthread or return of the parts to initial position, as shown by Fig. 2. Should a second hopper misthread occur, the weft fork will again not be tilted and the actuator 9 will move the transverse shaft 5 and finger 41, as before, but as the rider hammer also moves forward it engages the nose 36 of the rider and moves it from the position shown by Fig. 7 to that of Fig. 8, thereby causing the shoulder 45 to move the lever 25 and cause loom stoppage. Should filling be present on this detecting movement with the parts as shown by Fig. 7, as would be the case if a second hopper misthread did not occur, the finger 41 will not be moved, and as the rider hammer on its frontward movement engages and moves the rider, the incline 40 of the rider will slide over the end of the finger and the parts will assume the original position, as indicated in Figs. 9 and 2, and the loom will continue to run.

Figure 3:
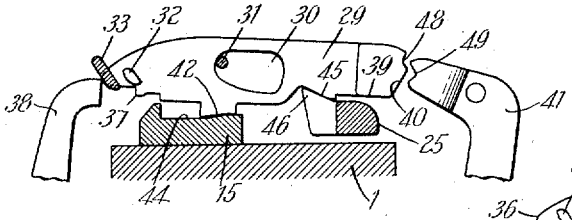
Figs. 3, 4, 5, 6, 7, 8 and 9 are detail views showing various positions assumed by the rider and its immediately associated parts under varying conditions of the filling to be herein described.
Figure 4:
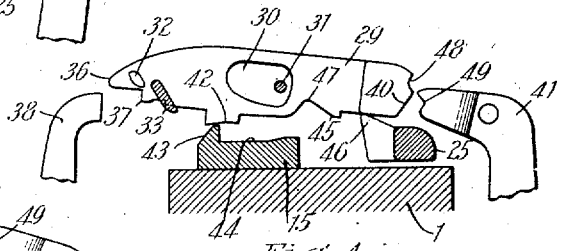
Figure 5:
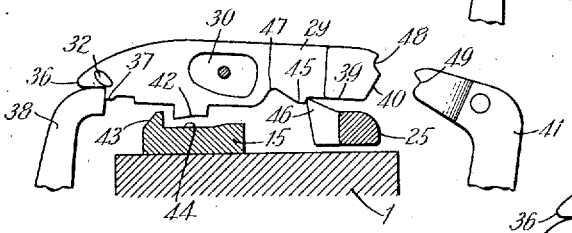
Figure 6:
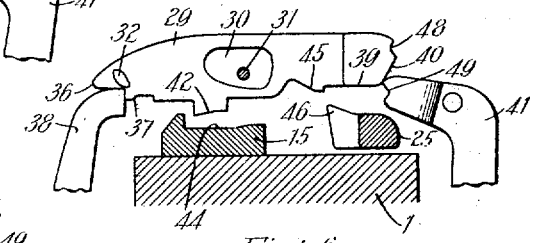

Filling replenishment by first failure of filling from any cause places the parts successively from the position shown by Fig. 2 to that of Figs. 3 and 4, the last position being assumed as the hammers and finger move backward on their non-detecting action. If, now, there is no "hopper misthread" on the next detecting movement, in which case filling would be laid by the shuttle, the parts pass from position of Fig. 4 to that of Fig. 6 and then Fig. 7, the last position being assumed as the hammers move back on the non-detecting movement, whether filling be present or not. Should a "real misthread" occur, however, the filling will be broken as the shuttle returns to the replenishing side of the loom after replenishment, so that on the next detecting movement of the hammers, which occurs following the detecting pick of the shuttle to the non-replenishing side of the loom, the rider hammer will meet the nose 36 of the rider in position shown by Fig. 7, and the finger 41 will be moved by the actuator 9, as before, with the result that the shoulder 45 will cause the lever 25 to effect loom stoppage. Thus in the present invention it will be noted that upon the occurrence of a double hopper misthread the loom will stop, and will also be stopped by the occurrence of a real misthread; in other words the loom will stop if on two alternate detecting beats the filling be absent; that is, if it be absent on one detecting beat, present on the next detecting beat, and absent on the next detecting beat the loom will stop.

What is claimed is:

1. In a loom of the character described, the combination of the lay, a transverse shaft and means for actuating it to cause filling replenishment on the occurrence of filling absence during a detecting beat, and means for causing loom stoppage on the occurrence of a double hopper misthread and on the occurrence of a real misthread.

2. In a loom of the character described, the combination of the lay and its shuttle boxes, a detector to detect the presence or absence of filling, means for controlling replenishment of filling on the detection of filling absence, and means to stop the loom on the occurrence of either a double hopper misthread or a real misthread.

3. In a loom of the character described, the combination of the lay and its shuttle boxes, a detector to detect the presence or absence of filling, means for controlling replenishment of filling on detection of filling absence, and means to cause loom stoppage when filling is absent on two alternate detecting beats whether it is absent or not on the intermediate detecting beat.

4. In a loom of the character described, the combination of means for detecting the presence or absence of filling in the shed, filling replenishing controlling means adapted to be actuated when filling is absent on a detecting beat, and means permitting continuation of the loom operation upon the occurrence of a single hopper misthread, and causing loom stoppage on the occurrence of either a double hopper misthread or a real misthread.

5. In a loom of the character described, the combination of means for detecting the presence or absence of filling in the shed, filling replenishing controlling means adapted to be actuated when filling is absent on a detecting beat, and means comprising a rider for permitting the loom to continue in operation on the occurrence of a single hopper misthread and for causing loom stoppage on the occurrence of a double hopper misthread or a real misthread.

6. In a loom of the character described, the combination of means for detecting the presence or absence of filling in the shed, filling replenishing controlling means adapted to be actuated when filling is absent on a detecting beat, and means for stopping the loom when the filling is absent on a detecting beat causing replenishment, present on the next detecting beat, and absent on the next detecting beat.

7. In a loom of the character described, the combination of means for detecting the presence or absence of filling in the shed, filling replenishing controlling means adapted to be actuated when filling is absent on a detecting beat, and means for controlling the loom operation comprising a member and its actuating devices for moving it from normal to a secondary position following the first detection of filling absence, and to a third position on the next detecting movement whether filling be present or absent to locate the parts for causing loom stoppage, and to a fourth position to stop the loom if filling is absent on the third detecting movement.

8. In a loom of the character described, the combination of means for detecting the presence or absence of filling in the shed, filling replenishing controlling means adapted to be actuated when filling is absent on a detecting beat, and means for controlling loom operation, comprising a member and its actuating devices for causing said member to move from normal to a secondary position on the detecting movement when filling is first absent and to a third position on the next detecting movement whether filling be present or not, and to initial position upon presence of filling on the succeeding detecting movement.

9. In a loom of the character described, the combination of means for detecting the presence or absence of filling, filling replenishing controlling means adapted to be actuated upon the detecting of filling absence, a rider, a rider hammer and a finger, means for causing the rider hammer and finger to move the rider from normal to a secondary position on a first absence of filling, to a third position whether filling be present or not on the next detecting movement, and either to a position for effecting loom stoppage should filling be absent on the succeeding detecting movement or back to normal position in case filling is present on such detecting movement.

10. In a loom of the character described, the combination of means for detecting the presence or absence of filling, filling replenishing controlling means adapted to be actuated upon the detecting of filling absence, a loosely mounted rider, a rider hammer and a finger, means for causing the rider hammer and finger to move the rider from normal to a secondary position on a first absence of filling, to a third position whether filling be present or not on the next detecting movement, and either to a position for effecting loom stoppage should filling be absent on the succeeding detecting movement or back to normal position in case filling is present on such detecting movement.

11. In a loom of the character described, the combination of means for detecting the presence or absence of filling in the shed, filling replenishing controlling means adapted to be actuated when filling is absent on a detecting beat, a rider having a cam portion, a rider lifter having a coöperating portion, and a rider hammer and finger for acting upon the rider to cause it to effect loom stoppage on the occurrence of filling absence on two alternate detecting beats whether it is absent or not on the intermediate beat.

In testimony whereof, I have signed my name to this specification.

JONAS NORTHROP.